Patented Nov. 23, 1937

2,099,765

UNITED STATES PATENT OFFICE 2,099,765

FINISHING TEXTILES

Horst Dietrich Freiherr von der Horst, Leuna, and Ferdinand Muenz and Adolf Vogt, Frankfort-on-the-Main, Germany, assignors to I. G. Farbenindustrie Aktiengesellschaft, Frankfort-on-the-Main, Germany No Drawing. Application December 27, 1933, Serial No. 704,144. In Germany December 29, 1932

9 Claims. (Cl. 91—70)

The present invention relates to a process of finishing textiles and sizing materials suitable for carrying out the said process.

We have found that textiles may be finished in a very advantageous manner by treating them in an aqueous medium with a compound capable of reacting as an aldehyde and starch in a form capable of yielding a paste, preferably in the presence of acid-reacting substances. The most suitable compounds capable of reacting as an aldehyde are formaldehyde and substances yielding the same, such as hexamethylenetetramine. The process may be carried out by drying starch in the presence of aldehydes such as formaldehyde or substances splitting off aldehydes such as hexamethylenetetramine on the fibre in the presence of acid reacting compounds such as acids, acid salts and substances splitting off acids. This method of carrying out the invention is of great industrial value because the working up and drying of the textiles may be carried out in the usual manner without any special precautions. Another very advantageous method of performing the process according to the present invention consists in treating the fibres with reaction products of formaldehyde and starch which are still capable of yielding a paste and subsequently drying at elevated temperatures. The treatment of the textiles with the said product is preferably carried out in the presence of acid reacting substances advantageously of weakly acid-reacting substances, namely acids, substances which are not acids themselves but have an acid reaction and substances splitting acids. Of course the presence of such acid substances as would injure the fibres, for example by an oxidizing action, is avoided.

The starch preparations suitable for the said treatment may be obtained by treating starch of any origin, for example potato starch, wheat starch, rice starch, tapioca starch and the like with formaldehyde, preferably at ordinary temperature. The period of the interaction of formaldehyde and starch depends on the special kind of starch used; it is so selected that the starch is still capable of yielding a paste after the said interaction is completed. Instead of formaldehyde itself substances yielding formaldehyde may be used, for example paraformaldehyde, condensation products of formaldehyde with acetone and the like. After the reaction between formaldehyde and starch the reaction product formed is dried at ordinary or slightly elevated temperature, if desired, under decreased pressure. The product thus obtained is treated at elevated temperature before its employment for finishing textiles with water while adding weakly acid-reacting substances, for example weak acids or acid reacting salts such as phosphoric acid, acetic acid, succinic acid, adipinic acid, benzoic acid, phthalic acid, mono sodium phosphate, sodium bisulphate, sodium sulphocyanide, the ammonium salt of adipinic acid and the like. Acid reacting substances injuring the fibres such as concentrated hydrochloric acid or acids having an oxidizing reaction are avoided.

According to the present invention textiles such as calico fabrics, bloom fabrics, linen, especially buckram, shirtings, collars and the like or animal fibres may be finished industrially in a simple manner. For example the said textiles are soaked with a bath containing starch preparations obtained as described above in a pasted state and in suitable proportions, the said textiles then being handled in a further bath which is weakly acid and finally dried at an elevated temperature, for example at about 100° C. The finishing of the textiles may also be carried out in one bath; in this case the acids or acid reacting substances mentioned are added to the starch before or after the treatment with formaldehyde.

In many cases it is advantageous to use further finishing materials besides the products of the interaction of starch with formaldehyde. An especially valuable finishing material is obtained by incorporating the starch treated with formaldehyde in the manner set forth above with ordinary starch, allowing the mixture to stand for a prolonged time and then using it for finishing purposes. Further additions suitable for finishing processes may be added to the baths, for example fillers, such as kaoline, pipe clay, China clay, alkali metal silicates, magnesium sulphate and the like; softening agents, such as soaps, Turkey red oils, waxes, for example bees wax, Japan wax, paraffin and products obtainable by acting with alkylene oxides and similarly reacting compounds on organic compounds containing hydroxyl, amino or carboxylic acid groups, wetting agents and agents causing a high gloss of the textiles may be employed in addition to the substances mentioned above.

By working in the said manner finishings are obtained which are very stable to washing; textiles finished in the said manner give off only a small part of the finishing material applied thereto according to the present invention even after repeated washing with soap and soda.

The finished fibres obtainable according to the present invention may contain considerable amounts of the finishing material, for example between 5 and 20 per cent of the fibre weight, preferably between 10 and 15 per cent.

The following examples will further illustrate how the invention may be carried out in practice, but the invention is not restricted to these examples. The parts are by weight.

Example 1

500 parts of potato starch are treated for 7 days at ordinary temperature with 330 parts of a 30 per cent formaldehyde solution and subsequently dried at 45° C. in vacuo. 5 parts of the starch thus treated are pasted by means of 0.3 part of ammonium sulphocyanide in 100 parts of water.

Calico fabric is impregnated with the mass obtained in the usual manner and subsequently dried for 30 minutes at 100° C. The fabric obtained has a finishing stable to washing; only 16 per cent of the finishing material applied to the fibre is removed therefrom by washing twice with soap and sodium carbonate.

Example 2

1 part of concentrated hydrochloric acid and 5.7 parts of potato starch are introduced while stirring at 90° C. into 5.7 parts of a water-soluble condensation product obtainable from 1 molecular proportion of acetone and 9.7 molecular proportions of formaldehyde in alkaline solution. The mixture is allowed to stand at the said temperature until a clear solution is formed. The condensation product of starch and formaldehyde thus obtained is neutralized by means of sodium acetate and 3 parts thereof are pasted together with 5 parts of ordinary potato starch and 0.3 part of ammonium sulphocyanide in 100 parts of water.

A calico fabric is treated with the finishing mass thus obtained and dried for 30 minutes at 100° C. whereby a material is obtained the finishing of which is very stable to repeated washing with soap and soda.

Example 3

5 parts of potato starch, 1.5 parts of a 30 per cent formaldehyde solution and 100 parts of water are stirred together for 24 hours at ordinary temperature, the starch thus treated being pasted subsequently with the addition of 1.7 parts of acetic acid at 80° C. A mass is thus obtained which is directly suitable for the production of finishings on cotton and linen fabrics which are fast to washing. After washing such fabrics twice with a soap and sodium carbonate 85 per cent of the finishing material applied to the fibre is still present thereon.

Example 4

5 parts of rice starch, 1.5 parts of a 30 per cent formaldehyde solution and 100 parts of water are caused to react with one another at ordinary temperature for 24 hours. The starch is then pasted by means of 1.7 parts of malonic acid while warming at 80° C. A mass is thus obtained which is very suitable for producing finishings for example on linen or bloom fabrics which are stable to washing.

Example 5

50 parts of the product of the reaction of formaldehyde and starch obtained according to Example 4 are suspended in 1000 parts of water, 2 parts of ammonium sulphocyanide being added thereto. Collars are treated with the said suspension while using a bath proportion of 1:10 in a rolling keg until the major part of the starch is absorbed. The material is then slung off and the collars are ironed in the usual manner.

Example 6

125 parts of potato starch are treated for 24 hours at ordinary temperature with 75 parts of a 30 per cent formaldehyde solution and subsequently dried at 50° C. under decreased pressure. 8 parts of the product thus obtained are pasted together with 42 parts of potato starch by means of 1 part of ammonium sulphocyanide in 1000 parts of water at 60° C. The back side of carpet fabrics are treated with the mass obtained in a finishing apparatus for example in a "Rackel-machine" and dried for half an hour at about 100° C. By this treatment the fabric becomes mechanically stable and fast to washing and water.

Example 7

500 parts of potato meal are treated with 330 parts of a 30 per cent formaldehyde solution for 5 days at ordinary temperature and then dried in vacuo at 45° C. and ground. One part of this preparation is mixed with 2 parts of potato meal and the mixture is allowed to stand for 5 or more days. The product thus obtained is readily soluble in water to form a paste and is suitable for finishing fabrics such as linen or cotton in the presence of acid reacting substances such as ammonium oxalate, the finishings obtained being very fast to washing.

Example 8

10 parts of the mixture of untreated potato meal and of potato meal treated with formaldehyde as described in Example 7 are dissolved in 1000 parts of water and 2 parts of ammonium oxalate and 1 part of titanium dioxide are added thereto. Artificial silk fabrics are handled in the bath thus obtained in the usual manner at between 60° and 70° C.; the fabric is then squeezed and dried for about 15 minutes at 100° C. By the said treatment the artificial silk fabric acquires a full, strong touch similar to that of silk taffeta. The finishing obtained is very fast to washing.

Example 9

1 part of the reaction product of formaldehyde and potato starch obtained according to Example 6 is thoroughly mixed with 2 parts of ordinary potato starch and the mixture is allowed to stand for one week. A bath is prepared containing per litre of water 75 grams of the starch preparation prepared as described above, 1.5 grams of ammonium oxalate and 10 cubic centimetres of a 30 per cent formaldehyde solution. Calico fabric is continuously impregnated at about 70° C. with the said bath in a finishing machine. Then the fabric passes through a so-called Foulard finishing machine and is led for four times over drying cylinders heated by means of steam having a pressure of two atmospheres and dried. A material is thus obtained having a finishing very stable to washing. Even after washing the fabric three times with soap and soda still 81.6 per cent of the finishing mass is present on the fabric.

Example 10

A mixture of 100 parts of potato starch, 15 parts of a 30 per cent formaldehyde and 0.5 part of oxalic acid are pasted by heating in aqueous solution. Calico fabric is treated in the bath thus obtained and dried in the warm. The finishing thus produced is stable even to repeated intense washing.

Example 11

100 parts of soluble starch are pasted by means of 4 parts of ammonium oxalate and 7 parts of para-formaldehyde in aqueous solution and cotton satin is impregnated with the finishing mass thus produced. The finishing is not injured by the usual washing treatment. Instead of ammonium oxalate other salts such as ammonium chloride, ammonium sulphocyanide and the like may be used.

Example 12

50 parts of soluble starch and 50 parts of potato starch are pasted by heating in an aqueous solution and 10 parts of hexamethylenetetramine and 1 part of oxalic acid are added to the paste. Cotton fabric treated with the said mass acquires a finishing stable even to repeated washing treatments.

What we claim is:—

1. The process of finishing organic textiles which consists in treating them in an aqueous medium with starch in a form capable of yielding a paste and with a substance selected from the class consisting of formaldehyde and compounds yielding formaldehyde under the conditions obtaining and reacting with starch in the warm, and drying the said textiles in the warm while adding an acid-reacting substance.

2. The process of finishing organic textiles which consists in treating them in an aqueous medium with starch in a form capable of yielding a paste and with a substance selected from the class consisting of formaldehyde and compounds yielding formaldehyde under the conditions obtaining and reacting with starch in the warm, and drying the said textiles in the warm while adding a weakly acid-reacting substance.

3. The process of finishing organic textiles which comprises treating starch with formaldehyde and an acid-reacting substance to give a product still capable of yielding a paste and treating the said textiles in an aqueous medium with the said product and drying the said textiles in the warm.

4. The process of finishing organic textiles which comprises treating starch with formaldehyde and a weakly acid reacting substance to give a product still capable of yielding a paste and treating the said textiles in an aqueous medium with the said product and drying the said textiles in the warm.

5. In the process of finishing organic textiles by treatment with a paste obtained by the steps which comprise treating starch with a substance selected from the group consisting of formaldehyde and substances which yield formaldehyde under the conditions obtaining and treating the resultant reaction product with an acid reacting substance, water and heat to convert the treated starch particles into a paste.

6. In the process of finishing organic textiles by treatment with a paste obtained by the steps which comprise treating starch at ordinary temperature for several days with a substance selected from the group consisting of formaldehyde and substances which yield formaldehyde under the conditions obtaining, forming a water suspension of the treated starch particles, adding an acid reacting substance thereto and heating the suspension in order to form a paste.

7. In the process of finishing organic textiles the steps which comprise treating starch with a substance selected from the group consisting of formaldehyde and substances which yield formaldehyde under the conditions obtaining, forming a water suspension of the treated starch particles, applying this suspension to an organic textile fabric, treating the suspension in contact with said fabric with an acid reacting substance and drying said treated fabric at a temperature of approximately 100° C.

8. In the process of finishing organic textiles the steps which comprise treating starch with a substance selected from the group consisting of formaldehyde and substances which yield formaldehyde under conditions obtaining, forming a water suspension of the treated starch, adding an acid reacting substance, heating the suspension to form a paste, applying the paste to an organic textile fabric and drying the same at a temperature of approximately 100° C.

9. Water-soluble starch pastes obtained by reacting starch with a substance selected from the group consisting of formaldehyde and substances which yield formaldehyde under the conditions obtaining, to the point where a product is obtained which can be pasted with water in the presence of a weakly acid reacting substance, and pasting said product by treatment in water in contact with said substance.

HORST DIETRICH FREIHERR
       VON DER HORST.
FERDINAND MUENZ.
ADOLF VOGT.